2,744,123

ALKYL IODIDE CATALYZED TUNG OIL ISOMERIZATION

Leo A. Goldblatt, New Orleans, La., assignor to the United States of America as represented by the Secretary of Agriculture No Drawing. Application December 4, 1953, Serial No. 396,353

4 Claims. (Cl. 260—405.6)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of beta-eleostearates. More particularly, this invention provides a process of isomerizing alpha-eleostearates to beta-eleostearates.

Beta-eleostearic acid is a particularly reactive form of eleostearic acid and differs from the naturally occurring alpha-eleastearic acid in its rates of reaction, its physical and chemical properties and in the properties of its derivatives, such as esters, amides, soaps, Diels-Adler addition products, etc. Beta-eleostearins are glycerides of beta-eleostearic acid having numerous valuable applications, such as drying oil components, by virtue of their reactive oletinic groups.

Sunlight, iodine, sulfur, selenium, and various less active compounds are known to catalyze the isomerization, but in a relatively non-uniform and unpredictable manner. For example, exposure to sunlight is known to cause tung oil to isomerize and solidify, slowly, rapidly, or sometimes not at all. Crystals of iodine, selenium and the like catalysts, when contacted with tung oil soon become coated with solid, and the remainder of the oil solidifies very slowly.

In accordance with this invention, alpha-eleostearates are isomerized by mixing them with a minor amount of a volatile hydrocarbon iodide. In a preferred embodiment of this invention, a normally liquid tung oil containing from about 70 to 80% alpha-eleostearin is isomerized by mixing the oil with from about 0.005 to 0.02 part by weight of an alkyl iodide of from 1 to 5 carbon atoms. In general, exposing the mixture of the alpha-eleostearates and the iodide to actinic light increases the rate of isomerization; and the rate of isomerization, in the presence or absence of actinic light can also be increased by air blowing the alpha-eleostearates to induce the formation of a minor amount of peroxides. The air blowing can suitably precede or follow the mixing of the eleostearates with the hydrocarbon iodide.

Beta-eleostearins produced by isomerizing tung oil in accordance with this invention can suitably be isolated or purified by conventional processes for isolating or purifying individual glycerides, or can be employed in the form of mixtures essentially comprising beta-eleostearins mixed with the glycerides of other fatty acids.

Particular esters or other derivatives of the beta-eleostearic acid can suitably be prepared either by preparing the corresponding derivatives of alpha-eleostearic acid and then isomerizing the derivatives or by first isomerizing alpha-eleostearic acid and preparing the derivative from beta-eleostearic acid.

Alpha-eleostearates which can suitably be employed in the present process include alpha-eleostearic acid and its pure mono-, di-, or triglycerides or mixtures thereof in which the acyl radicals comprise the alpha-eleostearyl radical or the alpha-eleostearyl radical and other radicals with which it is copresent in tung oil, or other esters of alpha-eleostearic acid with mono- or polyhydric alcohols, or any other derivative of alpha-eleostearic acid which will not react detrimentally with the iodides used. If the alpha-eleostearates are solid, it is preferable to dissolve them in suitable solvents before addition of the iodide. Tung oils containing from about 70-80% alpha-eleostearates are preferred starting materials for employment in the present process.

The hydrocarbon iodides can suitably be any hydrocarbon iodide which is volatile enough to be distilled at temperatures below about 100° C. at pressures above about 20 mm. Illustrated examples of suitable hydrocarbon iodides include methyl iodide, ethyl iodide, propyl and isopropyl iodide, cyclopentyl iodide, iodobenzene, and the like. Alkyl iodides of from about 1 to 5 carbon atoms are preferred.

The amount of hydrocarbon iodides to be used will vary with the extent and/or rate of isomerization desired; in general from about 0.002 to 0.03 parts by weight based upon the weight of the alpha-eleostearins is sufficient to induce substantially complete isomerization within a reasonable time.

Beta-eleostearates produced in accordance with this invention can suitably be freed of the alkyl iodides and/or their reaction products by conventional glyceride purification procedures, e. g. by vacuum stripping.

Volatile liquids which are solvents for the alkyl iodides and are inert toward the glycerides, i. e. liquids such as hydrocarbons, ethers, esters and the like, can suitably be used where the use of a solvent is desired.

The following examples are illustrative of details of the invention.

Samples of a tung oil containing about 75% of alpha-eleostearins were mixed with 0.01 part by weight of the indicated hydrocarbon iodides. The mixtures were allowed to stand in ordinary hard glass laboratory vessels in the partly diffused sunlight and partly artificial light of a chemical laboratory. The approximate time required for crystals to form, and for the samples to solidify completely, are indicated in the following table. It is apparent that the readily removable hydrocarbon iodide materially increased the rate of isomerization.

| Example | Catalyst | Crystals Formed | Samples Solidified |
|---|---|---|---|
| 1 | Ethyl Iodide | 2 days | 5 days |
| 2 | Propyl Iodide | 2 days | 5 days. |
| 3 | Butyl Iodide | 3 days | 9 days. |
| 4 | Iso-amyl Iodide | 3 days | 10 days. |
|  | Blank | 4 weeks | 6 weeks. |

I claim:

1. A process of producing beta-eleostearates by isomerizing alpha-eleostearates which comprises: mixing alpha-eleostearates with from about 0.005 to 0.02 parts by weight of an alkyl iodide of from about 1 to 5 carbon atoms.

2. A process of isomerizing tung oil which comprises, mixing a normally liquid tung oil containing from about 70 to 80% alpha-eleostearin with from about 0.005 to 0.02 parts by weight of an alkyl iodide of from about 1 to 5 carbon atoms and exposing the mixture to actinic light.

3. The process of claim 2 in which the alkyl iodide is ethyl iodide.

4. The process of claim 2 in which the alkyl iodide is propyl iodide.

(References on following page)

References Cited in the file of this patent

UNITED STATES PATENTS 2,411,112   Ralston et al. _____ Nov. 12, 1946

OTHER REFERENCES

"Studies on Gelation of Tung Oil, XIV–XV, by Monzi Tatimori, J. Soc. of Chem. Ind., Tokyo, Suppl. Binding, vol. 44, pages 7–8 (1941).

"Polymerization of Tung Oil, VII, Effects of Various Inorganic Substances Upon the Gelation of Tung Oil," by Monzi Tatimori, Bulletin of the Chem. Soc. of Japan, vol. 16, pages 75–81 (1941).